(12) United States Patent
Hirabayashi et al.

(10) Patent No.: US 9,163,800 B2
(45) Date of Patent: Oct. 20, 2015

(54) OUTER CASING FOR VEHICLE LAMP, VEHICLE LAMP AND MANUFACTURING METHOD FOR THE SAME

(71) Applicant: Stanley Electric Co., Ltd., Tokyo (JP)

(72) Inventors: Shintarou Hirabayashi, Tokyo (JP); Kazuaki Hokota, Tokyo (JP); Yoshitaka Mizuyasu, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 356 days.

(21) Appl. No.: 13/845,392

(22) Filed: Mar. 18, 2013

(65) Prior Publication Data

US 2013/0242587 A1 Sep. 19, 2013

(30) Foreign Application Priority Data

Mar. 16, 2012 (JP) ................. 2012-060469

(51) Int. Cl.
| | | |
|---|---|---|
| *F21S 8/10* | (2006.01) | |
| *B29D 11/00* | (2006.01) | |
| *B29C 65/16* | (2006.01) | |
| *B29C 65/00* | (2006.01) | |
| *B29L 31/00* | (2006.01) | |

(52) U.S. Cl.
CPC .............. *F21S 48/00* (2013.01); *B29C 65/1635* (2013.01); *B29C 65/1654* (2013.01); *B29C 66/114* (2013.01); *B29C 66/131* (2013.01); *B29C 66/30223* (2013.01); *B29C 66/542* (2013.01); *B29C 66/8322* (2013.01); *B29D 11/0074* (2013.01); *F21S 48/1208* (2013.01); *F21S 48/1233* (2013.01); *F21S 48/2206* (2013.01); *F21S 48/2212* (2013.01); *B29C 66/1142* (2013.01); *B29C 66/71* (2013.01); *B29L 2031/747* (2013.01)

(58) Field of Classification Search
USPC ............ 362/516, 546, 520, 362, 351, 311.01, 362/311.14
See application file for complete search history.

(56) References Cited

U.S. PATENT DOCUMENTS

| | | | | |
|---|---|---|---|---|
| 5,321,594 | A * | 6/1994 | Hegemann et al. | 362/546 |
| 5,448,454 | A * | 9/1995 | Nonaka | 362/546 |
| 6,811,285 | B2 * | 11/2004 | Ferguson et al. | 362/267 |
| 7,665,868 | B2 | 2/2010 | Sato et al. | |
| 7,815,354 | B2 * | 10/2010 | Yamazaki et al. | 362/546 |
| 8,100,569 | B2 | 1/2012 | Owada | |
| 2001/0028567 | A1 * | 10/2001 | Akiyama et al. | 362/520 |
| 2001/0028568 | A1 * | 10/2001 | Akiyama et al. | 362/520 |
| 2006/0077681 | A1 * | 4/2006 | Ikeda et al. | 362/510 |
| 2006/0133086 | A1 * | 6/2006 | Bouteiller et al. | 362/268 |
| 2012/0155106 | A1 * | 6/2012 | Kosugi et al. | 362/546 |
| 2012/0188782 | A1 | 7/2012 | Sasaki | |
| 2012/0250344 | A1 | 10/2012 | Koshiba | |

FOREIGN PATENT DOCUMENTS

JP 2005-339989 A 12/2005

\* cited by examiner

*Primary Examiner* — Laura Tso
(74) *Attorney, Agent, or Firm* — Kenealy Vaidya LLP

(57) ABSTRACT

An outer casing for vehicle lamps, a vehicle lamp and a manufacturing method for the outer casing and the vehicle lamp can include an outer lens having a rib located at a peripheral portion thereof and a casing having a supporting portion located so as to face the rib formed in a ring shape. The rib of the lens can include an end portion formed in a convex shape in a width direction thereof in accordance with a light energy distribution of a laser welder, and can be attached to the casing with confidence by utilizing the energy distribution. Thus, the vehicle lamp using the outer casing can incorporate various lamps with an airtight structure and an adequate mechanical strength while preventing misalignment between the outer lens and the casing, and the manufacturing method can provide the outer casing using similar manufacture equipment as compared with conventional methods.

20 Claims, 11 Drawing Sheets

OUTER CASING FOR VEHICLE LAMP, VEHICLE LAMP AND MANUFACTURING METHOD FOR THE SAME

The application claims the priority benefit under 35 U.S.C. §119 of Japanese Patent Application No. 2012-060469 filed on Mar. 16, 2012, which is hereby incorporated in its entirety by reference.

BACKGROUND

1. Field

The presently disclosed subject matter relates to outer casings for vehicle lamps, vehicle lamps using the outer casing and manufacturing methods for the outer casing and the vehicle lamp. More particularly, the disclosed subject matter relates to outer casings utilizing a laser welding method, in which a joint portion between an outer lens and a casing can be welded with confidence by a general laser welder, and to vehicle lamps using the outer casings, which can incorporate various lamps such as a tail lamp with a high airtight structure, and further to methods for manufacturing the outer casings and the vehicle lamps.

2. Description of the Related Art

Conventional general vehicle lamps frequently incorporate various lamps such as a headlight, a position lamp, a tail lamp, a turn signal lamp, a stop lamp and the like into an outer casing, which is devised so as to match with a design of a vehicle as a front and rear combination lamp. The outer casing is generally composed of a casing to incorporate the various lamps and an outer lens attached to the casing so that light emitted from the various lamps can be emitted in a light-emitting direction for each of the lamps.

The outer casing may also perform a sealing function to protect the various lamps from a fluid such as rain, a dust such as dirt on a road, etc. In addition, in accordance with a trend of automotive lighting and for purpose of an improvement of fuel efficiency, the outer casing is typically reduced in weight, along with the various lamps incorporated therein, while maintaining an adequate mechanical strength.

Accordingly, the outer lens, which can be formed in a thin thickness, has been constantly required to cause a reduction in weight for headlights in addition to efficiently transmitting the lights emitted from the various lamps. Moreover, even when the outer lens can be formed in a thin thickness, the outer lens is attached to the casing with confidence while the outer casing is generally air proof and has an adequate mechanical strength.

Hence, a conventional outer casing that can satisfy certain customer needs is disclosed in Patent document No. 1, in which a joint portion between the outer lens and the casing can be fixed with confidence using a jointing material such as a sealing material, an adhesive material, a hot-melt adhesive material, etc. On the other hand, a conventional jointing method is disclosed in Patent document No. 2, in which an outer lens is attached to a casing by a laser welding method without using the jointing material.

FIG. 11 is a schematic side cross-sectional view depicting a conventional laser welding method for attaching an outer lens to a casing used for a vehicle lamp, which is disclosed in Patent document No. 2. The conventional laser welding method includes: preparing the casing 80 having a jointing surface 85; preparing the outer lens 82 having a joint portion 81 made from a plastic having a permeability of laser beam, and the joint portion 81 having an end surface 84; contacting the end surface 84 of the outer lens 82 with the jointing surface 85 of the casing 80; and emitting a laser beam 83 on said contacting surface between the end surface 84 and the jointing surface 85 of the casing 80 from a laser head 86 via the joint portion 81 of the outer lens 82, wherein at least one of the end surface 84 and the jointing surface 85 is formed in a fine concavo-convex shape.

In this case, the laser beam 83 may be emitted on the contact surface including the fine concavo-convex shape via the jointing portion 81, and the end surface 84 of the outer lens 82 may be attached to the jointing surface 85 of the casing 80 in a substantially planar fashion by crushing (or placing pressure upon) the fine concavo-convex shape on the contacting surface between the end surface 84 of the outer lens 82 and the jointing surface 85 of the casing 80.

According to the conventional laser welding method, the laser beam 83 is emitted after the end surface 84 of the outer lens 82 contacts with the jointing surface 85 of the casing 80 with accuracy so that a misalignment does not occur with respect to each other. The laser beam 83 may be emitted by a gauss distribution, in which a middle portion of the laser beam 83 emits a high light energy, and a peripheral portion of the laser beam 83 emits a low light energy as compared with the middle portion of the laser beam 83.

Accordingly, because a laser beam having a high light energy may emit at a middle portion on the contact portion between the end surface 84 of the outer lens 82 and the jointing surface 85 of the casing 80, and a laser beam having a relatively low light energy may emit at a peripheral portion on the contact portion between the end surface 84 of the outer lens 82 and the jointing surface 85 of the casing 80, the outer lens 82 may be attached to the casing 80 with confidence in a state of mutual melting at the middle portion on the contact portion.

However, it may be difficult for the laser welding method to attach the outer lens 82 to the casing 80 with absolute accuracy in a mutual state of a thermal melting at the peripheral portion on the contact portion, because the peripheral portion of the contact portion may be subject to a state of non-thermal melting. In addition, it may difficult using the conventional laser welding method to align the outer lens 82 with the casing 80 on all circumferences with accuracy.

While drivers sit at the wheel, vehicle lamps may be subject to vibrations caused by traffic, shocks, etc. Additionally, the insides of the vehicle lamps may attain a high temperature during operation especially in summer. The outsides of the vehicle lamps may attain a low temperature regardless of operation in winter, although the insides may still attain a high temperature during operation. Therefore, when the vehicle lamps have been used for a long time, in the vehicle lamps manufactured by the conventional laser welding method, dirt and dust, rain water and the like may penetrate from a small void in the contact portion between the end surface 84 of the outer lens 82 and the jointing surface 85 of the casing 80.

Especially, when a misalignment occurs between the end surface 84 of the outer lens 82 and the jointing surface 85 of the casing 80, the small void in the contact portion may allow easy penetration of dirt and dust, rain water, etc. As a result, the dirt and dust, the rain water and the like may degrade the performance of the vehicle lamps, and also may cause failures of the vehicle lamps in the worst case.

The above-referenced Patent Documents and an additional Patent Document are listed below and are hereby incorporated with their English abstracts and specification in their entireties.

1. Patent Document No. 1: U.S. patent application Ser. No. 13/433,104
2. Patent Document No. 2: Japanese Patent Application Laid Open JP2005-339,989

3. Patent Document No. 3: U.S. Pat. No. 7,665,868
4. Patent Document No. 4: U.S. Pat. No. 8,100,569
5. Patent Document No. 5: U.S. patent application Ser. No. 13/358,500

The disclosed subject matter has been devised to consider the above and other problems, features, and characteristics. Thus, embodiments of the disclosed subject matter can include outer casings for vehicle lamps, in which an outer lens can be attached to a casing including a peripheral portion of a joint portion thereof with confidence by a general laser welder. The disclosed subject matter can also include vehicle lamps using the outer casings, which can incorporate various lamps such as a headlight, a tail lamp, a position lamp, a turn signal lamp, a stop lamp and the like with a high airtight structure and an adequate mechanical strength while preventing a misalignment between the outer lens and the casing.

SUMMARY

The presently disclosed subject matter has been devised in view of the above and other problems, features, and characteristics in the conventional art, and to make certain changes and improvements to existing outer lenses and casings for vehicle lamps. An aspect of the disclosed subject matter includes outer casings for vehicle lamps, which can attach an outer lens to a casing with confidence using a general laser welder, and also includes vehicle lamps using the outer casings, which can incorporate various lamps such as a headlight and the like with a high airtight structure and an adequate mechanical strength while preventing a misalignment between the outer lens and the casing. Another aspect of the disclosed subject matter includes methods for manufacturing the outer casings and the vehicle lamps having a high airtight structure and an adequate mechanical strength and which can provide a similar lead time while using a similar manufacture machine in comparison with conventional outer casings for vehicle lamps and processes.

According to an aspect of the disclosed subject matter, an outer casing for vehicle lamps can include an outer lens having a facing surface and a rib, formed in at least one of a substantially planar shape and a dome shape, and including a light-transmitting resin having permeability with respect to a laser beam, the rib having both side surfaces and an edge portion projecting in an opposite direction of the facing surface along a peripheral portion, and therefore formed in a ring shape defined as a minimum width of the rib, the edge portion of the rib including both inclined surfaces and an end surface, and formed in a convex shape in a direction toward the width of the rib, wherein each of the both inclined surfaces is continuously connected to a respective one of the both side surfaces of the rib, the minimum width of the rib is a width of said connection between each of the both inclined surfaces and the respective one of the both side surfaces of the rib, and the end surface is located between the both inclined surfaces so as to form an end of the convex shape of the edge portion.

Additionally, the outer casing can also include a casing having a cavity and a supporting portion, and including a light-absorbing resin having absorbability with respect to the laser beam, the cavity including an opening and an attaching portion, the supporting portion being continuously connected to the cavity, the supporting portion projecting in an opposite direction of the opening of the cavity, and therefore formed in a ring shape so as to surround the opening of the cavity; and wherein the outer lens is attached to the casing between the rib of the outer lens and the supporting portion of the casing using the laser beam, wherein at least the edge portion of the rib is sunk into the supporting portion of the casing by light energy of the laser beam and forms a melting joint portion along with a part of the supporting portion of the casing.

In the above-described exemplary outer casing for the vehicle lamps, the end surface of the edge portion of the rib can be formed in at least one of a substantially plane shape and a convex shape, and each of the both inclined surfaces of the rib can also be formed in at least one of a substantially plane shape and a convex shape. The minimum width of the rib can be set up within a range of 1.8 to 3.0 mill meters in view of an adequate mechanical strength, etc. Additionally, the outer casing further can include a rib guide located in at least one direction toward the outer lens and toward the casing from the supporting portion of the casing so as to face at least one of the both side surfaces of the rib, thereby can easily prevent a misalignment between the outer lens and the casing.

Moreover, a vehicle lamp using the exemplary outer casings further can include a light source such as a bulb, a semiconductor light-emitting device and the like, which is located at the attaching portion of the casing so that a light-emitting direction of the light source is directed toward the outer lens in at least one of a direct way and an indirect way. In this case, the cavity can include an inner reflex surface located toward the opening thereof to improve a light-emitting efficiency of the light source, and also the inner reflex surface can include a parabolic surface so that the light source is located substantially on a symmetry axis of the parabolic surface to provide a predetermined light distribution.

According to the above-described exemplary outer casing and the vehicle lamp using the exemplary outer casing, the laser beam can emit light having a relative energy of 50 percent or more toward the end surface of the rib, and can generate the melting portion on the supporting portion of the casing. The laser beam can also emit light having a relative energy within a range of 25 to 50 percent around the melting portion, and can generate another melting portion surrounding the melting portion. Accordingly, both melting portions of the supporting portion may become a melting joint portion having a larger volume, and at least the edge portion of the rib can sink into the melting joint portion of the supporting portion due to the prescribed pressure from the outer lens toward the casing. Thereby, each of the rib and the supporting portion of the casing can joint with confidence via the melting joint portion. Thus, the disclosed subject matter can provide the outer casings, which can attach the outer lens to the casing with confidence using a general laser welder, and can provide vehicle lamps using the outer casing, which can incorporate various lamps such as a tail lamp with a high airtight structure and an adequate mechanical strength while preventing a misalignment between the outer lens and the casing.

Another aspect of the disclosed subject matter includes methods for manufacturing the above-described outer casings and the vehicle lamps. An exemplary method for manufacturing the outer casings and the vehicle lamps in the above paragraphs can include: providing the casing, in which the light source is located at the attaching portion provided at the cavity of the casing; placing the outer lens on the casing at a predetermined position so that the end surface of the rib of the outer lens contacts with the supporting portion of the casing; pressuring the end surface of the rib toward the supporting portion of the casing at a prescribed pressure; and emitting the laser beam from a direction toward the rib of the outer lens toward the supporting portion of the casing along the rib, wherein the laser beam emits light having a relative energy of 50 percent or more on the supporting portion of the casing contacted with the end surface of the rib at the prescribed pressure via the end surface of the rib.

According to the exemplary method for manufacturing the outer casings and the vehicle lamps described above, the casing and the outer lens can be made by a plastic injection molding method, and the outer can be attached to the casing by a general laser welding method, which are similar methods as compared to conventional processes. Thus, the method can provide outer casings and vehicle lamps having a high airtight structure and an adequate mechanical strength using manufacturing machines that are similar to those used to manufacture conventional outer casings.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
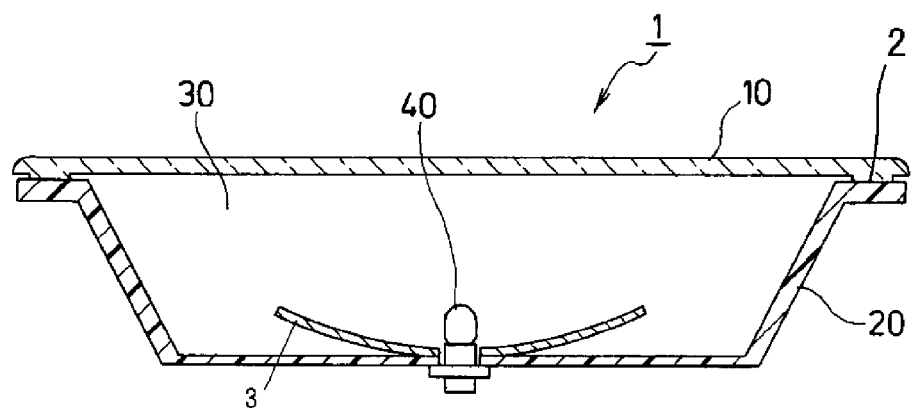
FIG. 1 is a cross-sectional view showing an exemplary embodiment of an outer casing for vehicle lamps made in accordance with principles of the disclosed subject matter.

Exemplary embodiments and manufacturing methods of the disclosed subject matter will now be described in detail with reference to FIG. 1 to FIG. 10, in which the same or corresponding elements use the same reference marks. FIG. 1 is a cross-sectional view showing an exemplary embodiment of an outer casing for vehicle lamps made in accordance with principles of the disclosed subject matter.

The vehicle lamp 1 can include: an outer casing 2 having of an outer lens 10 and a casing 20; an optical space 30 provided between the outer lens 10 and the casing: and a light source 40 having a light-emitting direction attached to the casing 20 and being located in the optical space 30 so that the light-emitting direction of the light source 40 is directed toward the outer lens 10 in a direct way. The light source 40 can also be located in the optical space 30 so that the light-emitting direction thereof is directed toward the outer lens in an indirect way via a reflect 3. As the light source 40, various light sources such as a bulb, a semiconductor light-emitting device, a halogen lamp, a discharge lamp and the like can be used.

Figure 2:
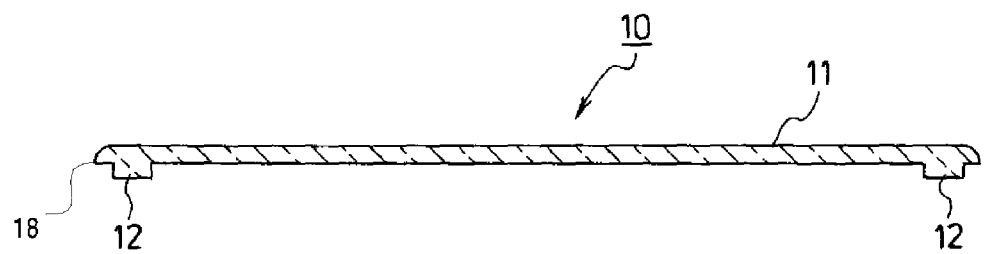
FIG. 2 is a cross-sectional view showing an outer lens in the embodiment of the outer casing shown in FIG. 1.

FIG. 2 is a cross-sectional view showing the outer lens 10 in the embodiment of the outer casing 2 shown in FIG. 1. The outer lens 10 can include a light-transmitting resin having permeability with respect to a laser beam and the light source 40, for example, polymethylmethacrylate resin (PMMA resin) (broad acrylic resin), polycarbonate resin (PC resin), and the like, and therefore can be made by a plastic injection molding method. The outer lens 10 can include: a facing surface 11 to emit at least one of an indirect light and a direct light emitted from the light source 40 in a direction toward a light-emission of the vehicle lamp 1; a peripheral portion 18 being adjacent the facing surface 11; and rib 12 projecting in an opposite direction of the facing surface 11 along the peripheral portion 18.

Figure 3:
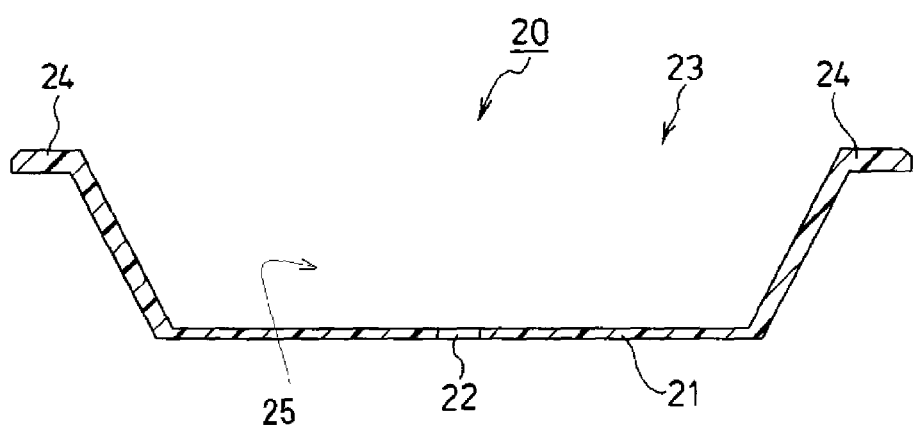
FIG. 3 is a cross-sectional view showing a casing in the embodiment of the outer casing shown in FIG. 1.

FIG. 3 is a cross-sectional view showing the casing 20 in the embodiment of the outer casing 2 shown in FIG. 1. The casing 20 can include a light-absorbing resin having absorbability with respect to a laser beam, for example, acrylonitrile styrene acrylate resin (ASA resin) and the like, and therefore can be made by the plastic injection molding method. The casing 20 can include a cavity 25 having an opening 23 that is formed by a base board 21; an attaching portion 22 being located at a bottom portion of the cavity 25 to locate the light source 40; and a supporting portion 24 being continuously connected to the base board 21, the supporting portion 24 projecting in an opposite direction of the opening 23 of the cavity 25, and therefore formed in a ring shape so as to surround the opening 23 of the cavity 25.

By welding the rib 12 formed in the ring shape of the outer lens 10 on the supporting portion 24 of the casing 20, which is also formed in the ring shape, the optical space 30 can be provided between the outer lens 10 and the casing 20. The light source 40 can be attached to the attaching portion 22, which is located at the bottom portion of the cavity 25 formed by the base board 21. In order to implement the above welding process between the rib 12 of the outer lens 10 and the supporting portion 24 of the casing 20 in a proper and reliable manner by a laser welding method, an edge portion of the rib 12 of the outer lens 10 can be formed in an optimal shape with respect to an energy distribution of a laser beam, as described in detail later.

Figure 4:
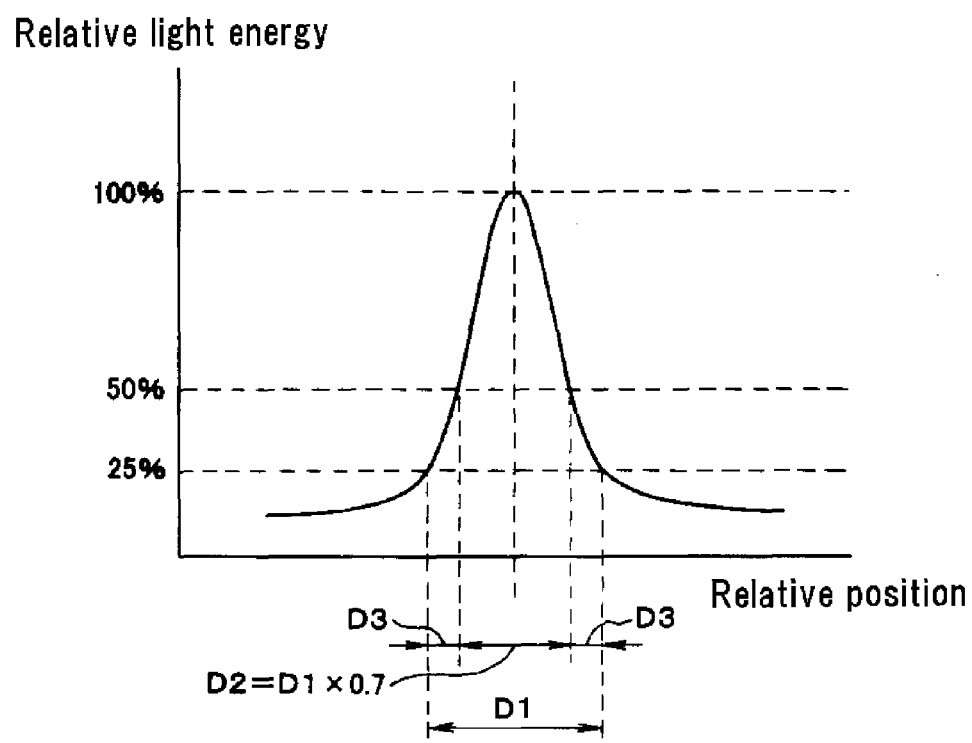
FIG. 4 is a graph showing a light energy distribution of a laser beam.

FIG. 4 is a graph showing a light energy distribution of a laser beam, wherein X-axis shows a relative position, and Y-axis shows a relative light energy. The light energy distribution of a laser beam used as the laser welding method can have gauss distribution, in which a middle portion of the laser beam emits light having a high energy and a peripheral portion of the laser beam emits light having a lower energy with increasing distance from the middle portion.

Because of this, the disclosed subject matter can use light energy having a relative energy within a substantially range of 25 to 100 percent as the laser beam. More specifically, because the laser beam can emit light having the relative energy of 25 percents or more on a region having a diameter D1 as shown in FIG. 4, at least one of a width of the rib 12 and a light-emitting area of the laser beam can be set up so that a maximum width of the rib 12 can be narrower than the diameter D1.

Thereby, the laser beam can emit light having the relative energy of 25 percent or more on the rib 12 in the laser welding process, and therefore may not emit weak light having the relative energy of less than 25 percent on the rib 12. Accordingly, a joint strength between the rib 12 of the outer lens 10 and the supporting portion 24 of the casing 20 can be maintained with confidence at a prescribed intensity. For reference, a laser light-emitting region having the relative energy of 50 percent or more can become a circular region having a diameter D2, which is approximately 70 percent of the region having the diameter D1.

Figure 5:
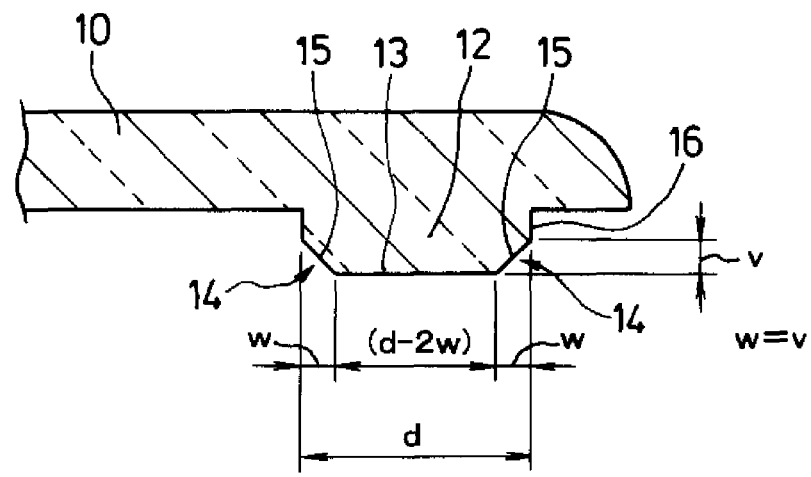
FIG. 5 is a cross-sectional view showing a first exemplary embodiment of a rib of the outer lens shown in FIG. 2.

A shape of the rib 12 will now be described in detail. FIG. 5 is a cross-sectional view showing a first exemplary embodiment of the rib 12 of the outer lens 10 shown in FIG. 2, wherein an end surface 13 and both inclined surfaces 15 is defined as the above-described edge portion of the rib 12, and the edge portion can be formed in a convex shape along the supporting portion 24 of the casing 20 so as to face the supporting portion 24. The rib 12 of the outer lens 10 can project in the opposite direction of the facing surface 11 along the peripheral portion 18 as described above in FIG. 2, and therefore can be formed in a ring shape defined as a minimum width d of the rib 12, which is between both side surfaces 16 when the both side surfaces 16 are substantially parallel with each other.

In this case, each of the both inclined surfaces 15 can be continuously connected to a respective one of the both side surfaces 16 of the rib 12, and the minimum width of the rib 12 becomes a width of said connection between each of the both inclined surfaces 15 and the respective one of the both side surfaces 16 of the rib 12. However, the both side surfaces 16 of the rib 16 are not necessarily parallel with each other, and the both side surfaces 16 can also be formed in a shape having a wider width toward the facing surface 11 with increasing distance from each of the both inclined surfaces 15. The end surface 13 can be located between the both inclined surfaces 15 so as to form an end of the convex shape of the edge portion described above.

When an end surface 13 of the rib 12, which contacts with the supporting portion 14 of the casing 20 and becomes a welding surface along with the supporting portion 14, is welded by the laser welding method while the end surface 13 of the rib 12 contacts with the supporting portion 14 of the casing 20, the laser beam may emit light having a high energy on a middle portion (e.g., the end surface 13) of the edge portion, and also may emit light having a relative weak energy as compared with the middle portion on a peripheral portion (e.g., the both inclined surfaces 15) of the edge portion of the rib 12.

Even when the end surface 13 of the rib 12 is welded by the laser welding method while the end surface 13 of the rib 12 contacts with the supporting portion 14 of the casing 20 with a relative appropriate pressure, sinking of the entire end surface 13 of the rib 12 into the supporting portion 14 of the casing 20 may be inhibited by edges of the end surface 13 that may become a non-melting state if there is not the both inclined surfaces 15 in the edge portion of the rib 12. The joint strength between the end surface 13 of the rib 12 and the supporting portion 14 of the casing 20 may not be maintained at the prescribed intensity.

Therefore, the edge portion of the rib 12 of the disclosed subject matter can include the both inclined surfaces 15 adjacent both edges of the end surface 13 by forming chamfers 14, which extend along both edges of the edge portion formed in the ring shape, and each of the both inclined surfaces 15 can be located between the end surface 13 and the respective one of the both side surfaces 16 of the rib 12 of the outer lens 10. In this case, the minimum width d between the both side surfaces 16 can be formed substantially the same as the diameter D1, where the laser beam can emit light energy having the relative energy within the range of 25 to 100 percent, so that the edge portion of the rim 12 can correspond to the diameter D1 of the laser beam.

Each width w of the both inclined surface 15 of the rib 12 can be formed substantially the same as a width D3, where the laser beam can emit light having the relative energy within a range of 25 to 50 percent, and which is the width D3 of a ring having the outer diameter of D1 and the inner diameter of D2 as shown in FIG. 4. Therefore, a width (d−2w) of the end surface 13 of the rib 12 can be formed in the diameter D2, where the laser beam can emit light having a relative energy of 50 percent or more, so the end surface 13 can correspond to the diameter D2 of the laser beam.

Thereby, in the laser welding process, the laser beam can emit light having relative energy within the range of 25 to 50 percent into the both inclined surfaces 15 each having width w by using the laser beam having width D3 formed in the ring shape, in which the outer diameter is D1 and the inner diameter is D2. The laser beam can also emit light having the relative energy of 50 percent or more into the end surface 13 having width (d−2w) by using the laser beam having the diameter D2 of the light-emitting region. As the light-emitting diameter to form a light distribution pattern of the laser beam, a light-emitting diameter having more than 1.3 times the width (d−2w) of the end surface 13 can be used.

In this case, the width (d−2w) of the end surface 13, where a laser beam having the relative energy of 50 percent or more is emitted, can become a width of approximately 70 percent with respect to the minimum width d of the rib 12 because the laser beam forms the light distribution having a gaussian distribution. Each width w of the both inclined surfaces 15, where a laser beam having the relative energy of 25 to 50 percents is emitted, can become a width of approximately 15 percent with respect to the minimum width d of the rib 12.

Each height v between the both side surfaces 16 and the end surface 13, that is each height of the both inclined surfaces 15, can be a substantially same as each width w between the end surface 13 and the both side surfaces 16 of rib 12. Accordingly, the both inclined surfaces 15 can be the same as the chamfers 14 formed by an amount w of the chamfers from the both edges of the end surface 13, and the width (d−2w) of the end surface 13 of the rib 12, where the laser beam having a relative energy of 50 percent or more is emitted, can become a melting portion, which sinks into the supporting portion 24 of the casing 20. The end surface 13 cannot be limited to a substantially planar surface described above. Various shapes can be used as the end surface 13.

Figure 6:
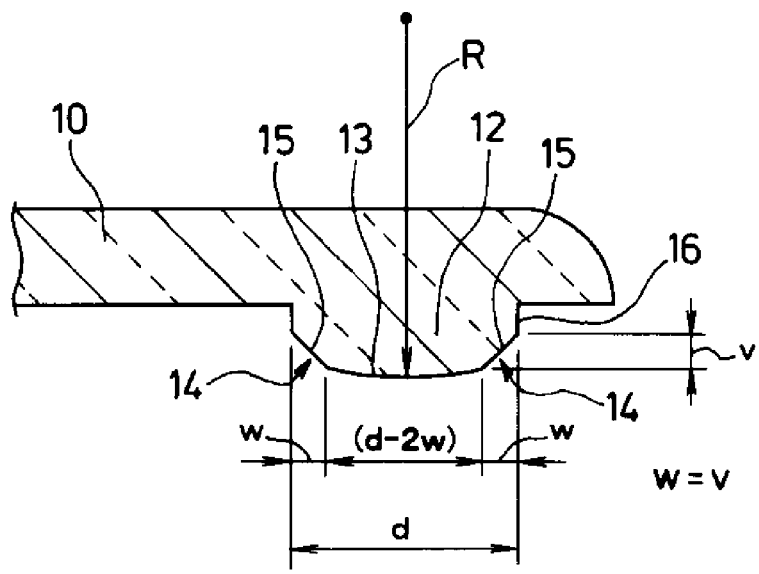
FIG. 6 is a cross-sectional view showing a second exemplary embodiment of the rib of the outer lens shown in FIG. 2.
Figure 7:
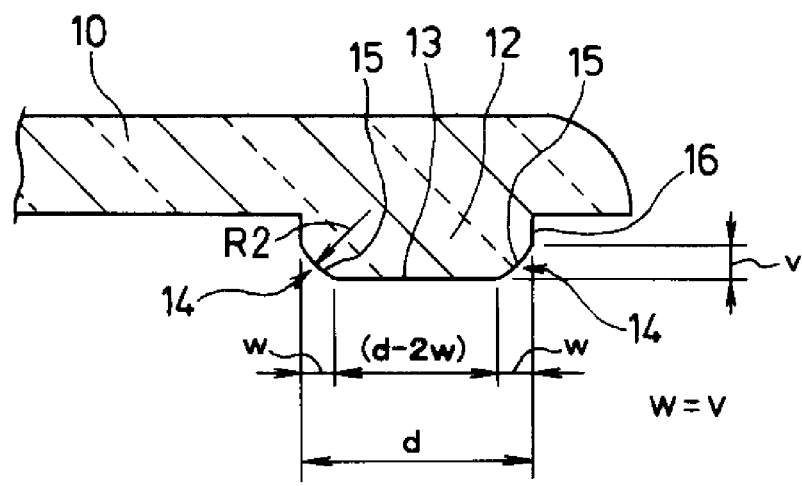
FIG. 7 is a cross-sectional view showing a third exemplary embodiment of the rib of the outer lens shown in FIG. 2.

FIG. 6 is a cross-sectional view showing a second exemplary embodiment of the rib 12 of the outer lens 10. The end surface 13 can also be formed in a convex shape having a curvature radius R1, and also can be formed in a different convex shape from the curvature radius R1. Additionally, each of the both inclined surfaces 15 cannot also be limited to the substantially planar surface. Each of the inclined surfaces 15 can be formed in a convex shape having a curvature radius R2, as shown in FIG. 7, and also can be formed in a different convex shape from the curvature radius R2 toward the casing 20.

Figure 8:
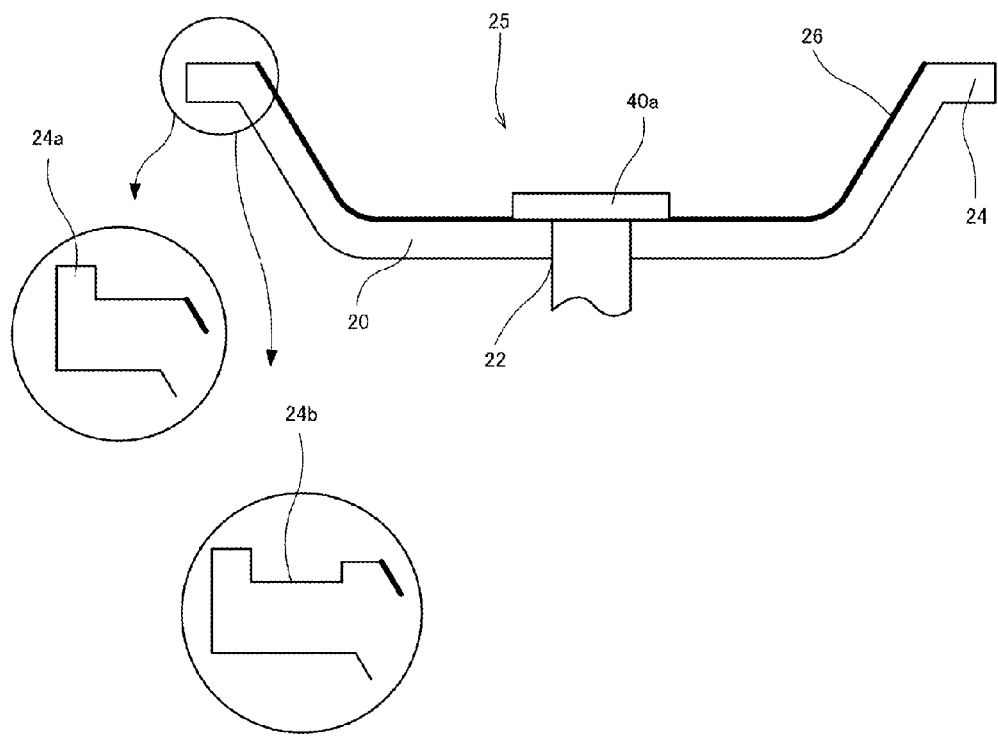
FIG. 8 is a cross-sectional view showing exemplary casings of the outer casing for the vehicle lamps made in accordance with principles of the disclosed subject matter.

The minimum width d of the rib 12 can be set up within a range of 1.8 to 3.0 mill meters in view of the joint strength of the outer casing 2, which incorporates various lamps therein as vehicle lamps, and also in view of an economic efficiency of casting resins. Methods for manufacturing vehicle lamps using the outer casing 2 will now be described in detail with reference to FIG. 8 to FIG. 9c. FIG. 8 is a cross-sectional view showing exemplary casings of the outer casing 2.

Process 1 is preparing the casing 20 and the light source 40a, and attaching the light source 40a to the attaching portion 22 located on the bottom portion of the cavity 25 of the casing 20. The casing 20 can include a reflector surface 26

(e.g., parabolic surface, free surface) made by aluminum vapor deposition method and the like according to usages of the vehicle lamps, as disclosed in Patent document No. 3. The reflector surface 26 can include a parabolic surface having a symmetry axis to provide a desired light distribution, and the light source 40a can also be located substantially on the symmetry axis of the reflector 26.

As the light source 40a, an LED optical unit such that is disclosed in Patent document No. 4, in which an LED light source is mounted on a circuit board and a projector lens is located adjacent the LED light source, can be used for an exemplary vehicle lamp of the disclosed subject matter. Additionally, a position lamp using a plurality of LEDs such that is disclosed in Patent document No. 5 can also be used as the light source 40a for another exemplary vehicle lamp of the disclosed subject matter.

In these cases, in order to prevent a misalignment between the casing 20 and the outer lens 10 in the laser welding process described later, the supporting portion 24 can include a rib guide 24a, which projects along at least one of the both side surface 16 of the rib 12 from the supporting portion 24 of the casing 20 toward the outer lens 10, and which is formed in a ring shape along a peripheral portion of the supporting portion 24 as shown in FIG. 8. The rib guide 24a can also contact with the at least one of the both side surfaces 16 of the rib 12 of the outer lens 10, and therefore can prevent the misalignment between the casing 20 and the outer lens 10 in the laser welding process.

The guide 24a can also be composed of a plurality of guides, which project along the at least one of the both side surfaces 16 of the rib 12 of the outer lens 10 from the supporting portion 24 toward the outer lens 10 without being formed in the ring shape. In addition, the supporting portion 24 of the casing 20 can also include a groove 24b such that may set the rib 12 of the outer lens 10 therein, in place of the rib guide 24a. Thereby, misalignment between the casing 20 and the outer lens 10 can easily be prevented.

Figures 9A, 9B, 9C:
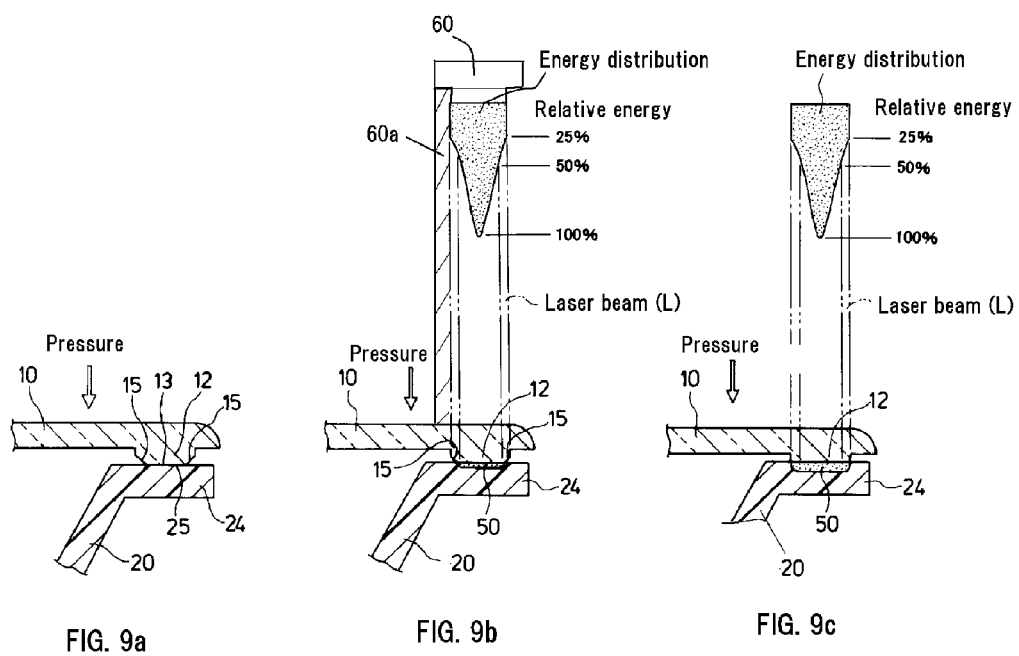
FIGS. 9a to 9c are cross-sectional views depicting an exemplary laser welding method for welding the outer casing for the vehicle lamps made in accordance with principles of the disclosed subject matter.

Process 2 is placing the outer lens 10 on the casing 20 at a predetermined position so that the end surface 13 of the rib 12 contacts with the supporting portion 24 of the casing 20, and maintaining the end surface 13 of the rib 12 and a contact surface 25 of the supporting portion 24 contacted with the end surface 13 at a prescribed pressure with respect to each other, as shown in FIG. 9a.

Process 3 is placing a laser scan head 60 of a laser welder in a direction toward the outer lens 10, and emitting a laser beam L along the rib 12 of the outer lens 10 using a laser guide 60a, as shown in FIG. 9b. In this case, the laser beam L emitted from the laser welder can transmit into the rib 12 and the end surface 13 of the outer lens 10, which includes a light-transmitting resin having permeability with respect to the laser beam, and then can be emitted to the contact surface 25 of the supporting portion 24 of the casing 20, which includes a light-absorbing resin having absorbability with respect to the laser beam.

The contact surface 25 of the supporting portion 24 can absorb light energy of the laser beam L and can melt due to heat of the light energy. The said melting portion, which is close to the contact surface 25, can increase a volume thereof because of a thermal expansion effect, and an increase in said expansive volume can bulge toward the end surface 13 of the rib 12, which faces the melting portion of the contact surface 25 of the supporting portion 24.

At this time, because the end surface 13 of the rib 12 of the outer lens 10 and the contact surface 25 of the supporting portion 24 may maintain the contacted state at the prescribed pressure with respect to each other, the melting portion of the increase in the expansive volume, which bulges toward the end surface 13 of the rib 12, can transmit the thermal expansion effect thereof directly into the end surface 13 of the rib 12. A region, close to the end surface 13 of the rib 12 receiving the thermal expansion effect, can be hot-melted due to a reception of the thermal effect, and can form a melting region.

Then, the melting region of the end surface 13 of the rib 12 of the outer lens 10 and the melting portion of the supporting portion 24 of the casing 20 may reach a melting state with respect to each other, and a melting joint portion 50 can be formed to integrate the melting portion of the casing 20 into the melting region of the outer lens 10. Meanwhile at least the inclined both surfaces 15 of the rib 12 of the outer lens 10 can sink into the melting joint portion 50 of the supporting portion 24 of the casing 20 due to the prescribed pressure from the end surface 13 of the rib 12 toward the contact surface 25 of the supporting portion 24.

In Process 3 described above, the laser welder can emit the laser beam L along the rib 12 of the outer lens 10 in at least one of a continuous way and an intermittent way according to shapes of the outer casing 2, etc. The laser beam L can emit light having the relative energy of 50 percent or more into the end surface 13 having the width (d−2w) of the rib 12, and can generate the melting portion including the contact surface 25 on the supporting portion 24. The laser beam L can emit light having the relative energy within the range of 25 to 50 percent into the both inclined surfaces 15 each having the width w, and can accumulate a high residual heat between the both inclined surfaces 15 of the rib 12 and the supporting portion 24 surrounding the melting portion.

The laser welder can emit the laser beam L along the rib 12 of the outer lens 10 in at least one of the continuous way and the intermittent way using the laser guide 60a, and the inclined both surfaces 15 having the width w, in which the high residual heat is accumulated, can also be hot-melted because of an increase of the high residual heat. Then another melting region of the inclined surface 15 of the rib 12 of the outer lens 10 and the melting portion of the supporting portion 24 of the casing 20 may become another melting state with respect to each other, and the melting joint portion 50 having a larger volume can be formed to also integrate the other melting region of the both inclined surfaces 15 into the melting portion of the casing 20 and the melting region of the outer lens 10, as shown in FIG. 9c.

Meanwhile the whole end portion including the both inclined surfaces 15 of the rib 12 of the outer lens 10 can sink into the melting joint portion 50 of the supporting portion 24 of the casing 20 due to the prescribed pressure from the rib 12 of the outer lens 10 toward the supporting portion 24 of the casing 20. Thereby, each of the rib 12 of the outer lens 10 and the supporting portion 24 of the casing 20 can joint with confidence via the melting joint portion. Thus, the disclosed subject matter can provide the outer casings, which can incorporate various lamps such as a tail lamp with a high airtight structure.

Figure 10:
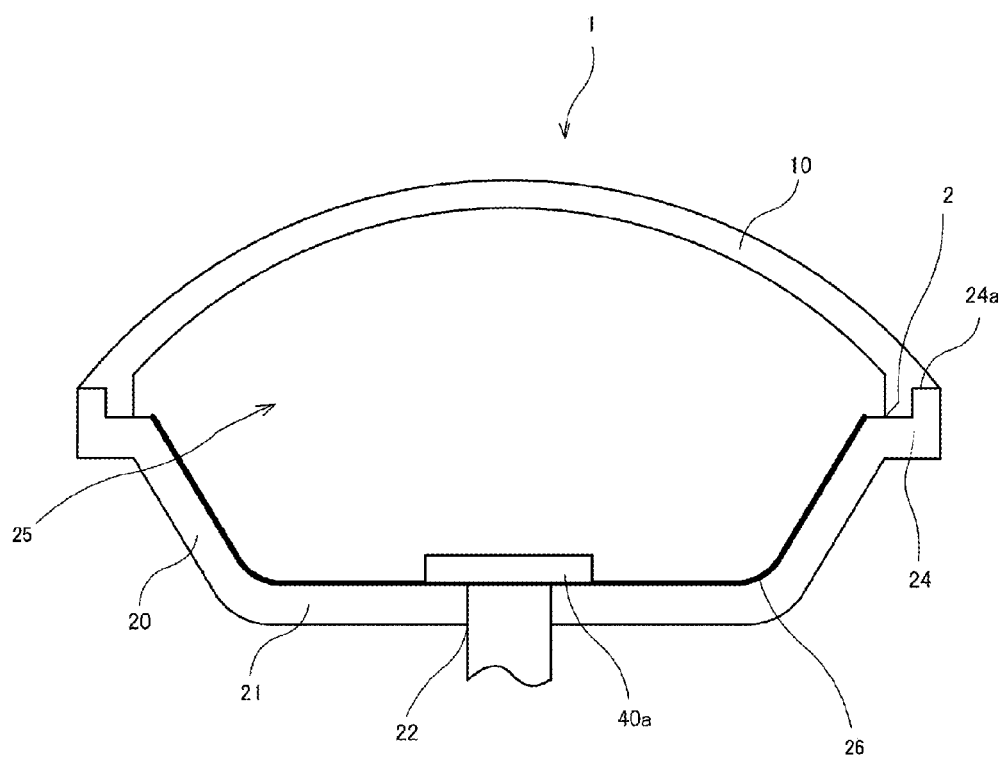
FIG. 10 is a cross-sectional view depicting an exemplary embodiment of a vehicle lamp made in accordance with principles of the disclosed subject matter.
Figure 11:
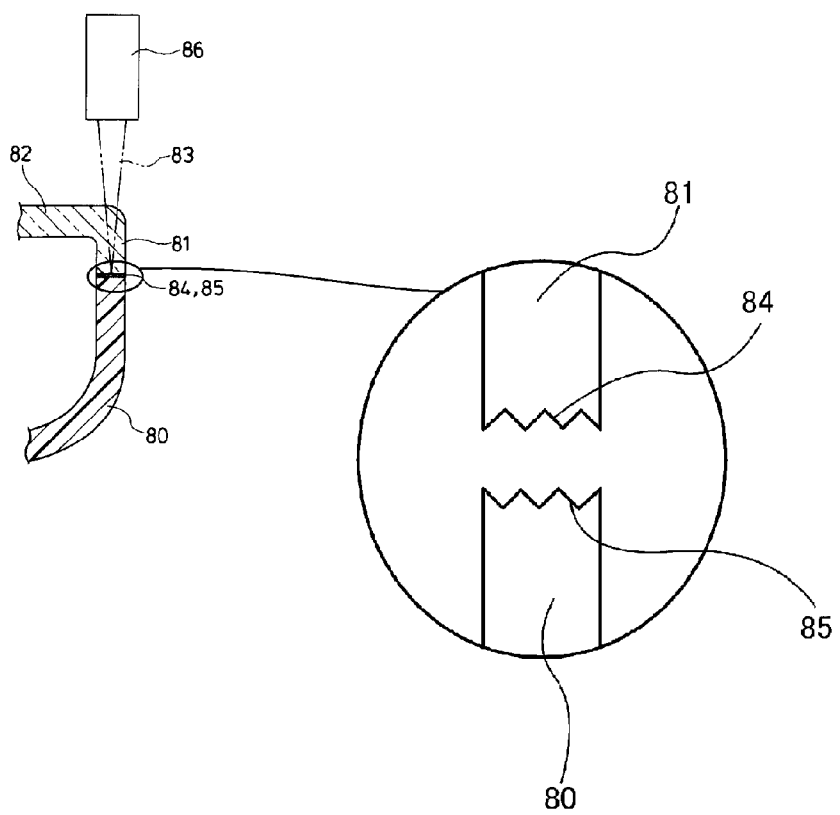
FIG. 11 is a schematic side cross-sectional view depicting a conventional laser welding method to attach an outer lens to a casing used for a vehicle lamp.

FIG. 10 is a cross-sectional view depicting an exemplary embodiment of a vehicle lamp made in accordance with principles of the above-described exemplary manufacturing method of the disclosed subject matter. The vehicle lamp 1 can include the outer lens 10, which is formed in a dome shape, and the casing 20 including the rib guide 24a as shown in FIG. 8. The rib guide 24a can prevent the misalignment between the outer lens 10 and the casing 20 so that the end portion, which is composed of the both inclined surfaces 15 and the rib 12 of the outer lens 10, can sink into the melting joint portion 50 of the supporting portion 24 of the casing 20 at a prescribed length while preventing the misalignment in the width direction of the rib 12 of the outer lens 10.

As described above, the disclosed subject matter can provide outer casings for vehicle lamps, which can attach an outer lens to a casing with confidence by utilizing a general laser welder having a light energy having a gaussian distribution, and also can provide vehicle lamps using the outer casings, which can incorporate various lamps such as a headlight and the like with a high airtight structure and an adequate mechanical strength while preventing a misalignment between the outer lens and the casing.

Furthermore, the disclosed subject matter can include methods for manufacturing the outer casings and the vehicle lamps having a high airtight structure and an adequate mechanical strength and which can provide a similar lead time while using a similar manufacture machine in comparison with conventional outer casings for vehicle lamps and processes.

Various modifications of the above disclosed embodiments can be made without departing from the spirit and scope of the presently disclosed subject matter. For example, a case, where either the light source 40 or the light source 40*a* is used as the light source, is described in the embodiments. However, a plurality of the light sources 40 can be used as the light source, and also a plurality of the light source 40*a* can be used as the light source. Various combinations of the light source 40 and the light source 40*a* can also be used as the light source.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. An outer casing for a vehicle lamp:
    an outer lens having a facing surface, a peripheral portion and a rib, the outer lens configured in at least one of a substantially planar shape and a dome shape, and including a light-transmitting resin having permeability with respect to a laser beam, the rib having both side surfaces and an edge portion projecting in an opposite direction of the facing surface along the peripheral portion and configured in a ring shape defined as a minimum width of the rib, the edge portion of the rib including both inclined surfaces and an end surface and configured in a convex shape in a direction toward the width of the rib, wherein each of both inclined surfaces is continuously connected to a respective one of both side surfaces of the rib, the minimum width of the rib is a width of said connection between each of both inclined surfaces and the respective one of both side surfaces of the rib, and the end surface is located between both inclined surfaces so as to form an end of the convex shape of the edge portion; and
    a casing having a cavity and a supporting portion, and including a light-absorbing resin having absorbability with respect to the laser beam, the cavity including an opening and an attaching portion provided in the cavity, the supporting portion being located adjacent the opening of the cavity, the supporting portion projecting in an opposite direction of the opening of the cavity, and therefore formed in a ring shape so as to surround the opening of the cavity,
    wherein the outer lens is attached to the casing between the rib of the outer lens and the supporting portion of the casing using laser beam light energy, wherein at least the edge portion of the rib of the outer lens is sunk into the supporting portion of the casing by laser beam light energy and forms a melting joint portion along with a part of the supporting portion of the casing.

2. The outer casing for a vehicle lamp according to claim 1, further comprising:
    a light source having a light-emitting direction being located at the attaching portion of the casing so that the light-emitting direction of the light source is directed toward the outer lens in at least one of a direct way and an indirect way.

3. The outer casing for a vehicle lamp according to claim 1, wherein the end surface of the edge portion of the rib of the outer lens is formed in at least one of a substantially plane shape and a convex shape toward the supporting portion of the casing.

4. The outer casing for a vehicle lamp according to claim 2, wherein the end surface of the edge portion of the rib of the outer lens is formed in at least one of a substantially plane shape and a convex shape toward the supporting portion of the casing.

5. The outer casing for a vehicle lamp according to claim 1, wherein each of both inclined surfaces of the rib of the outer lens is formed in at least one of a substantially plane shape and a convex shape toward the casing.

6. The outer casing for a vehicle lamp according to claim 2, wherein each of both inclined surfaces of the rib of the outer lens is formed in at least one of a substantially plane shape and a convex shape toward the casing.

7. The outer casing for a vehicle lamp according to claim 1, wherein the minimum width of the rib of the outer lens is within a range of 1.8 to 3.0 millimeters.

8. The outer casing for a vehicle lamp according to claim 2, wherein the minimum width of the rib of the outer lens is within a range of 1.8 to 3.0 millimeters.

9. The outer casing for a vehicle lamp according to claim 1, further comprising:
    a rib guide located in at least one direction toward the outer lens and toward the casing from the supporting portion of the casing so as to face at least one of both side surfaces of the rib of the outer lens.

10. The outer casing for a vehicle lamp according to claim 2, further comprising:
    a rib guide located in at least one direction toward the outer lens and toward the casing from the supporting portion of the casing so as to face at least one of both side surfaces of the rib of the outer lens.

11. A vehicle lamp, comprising:
    an outer lens having a facing surface, a peripheral portion and a rib, the outer lens configured in at least one of a substantially planar shape and a dome shape, and including a light-transmitting resin having permeability with respect to a laser beam, the rib having both side surfaces and an edge portion projecting in an opposite direction of the facing surface along the peripheral portion and configured in a ring shape defined as a minimum width of the rib, the edge portion of the rib including both inclined surfaces and an end surface and configured in a convex shape in a direction toward the width of the rib, wherein each of both inclined surfaces is continuously connected to a respective one of both side surfaces of the rib, the minimum width of the rib is a width of said connection between each of both inclined surfaces and the respective one of both side surfaces of the rib, and the end surface is located between both inclined surfaces so as to form an end of the convex shape of the edge portion;

a light source having a light-emitting direction; and a casing having a cavity and a supporting portion, and including a light-absorbing resin having absorbability with respect to the laser beam, the cavity including an opening and an inner reflex surface located toward the opening, the supporting portion being located adjacent the opening of the cavity, the supporting portion projecting in an opposite direction of the opening of the cavity and configured in a ring shape so as to surround the opening of the cavity, wherein the light source is located in the cavity so that the light-emitting direction of the light source is directed toward the opening of the cavity, wherein the outer lens is attached to the casing between the rib of the outer lens and the supporting portion of the casing using laser beam light energy, wherein at least the edge portion of the rib of the outer lens is sunk into the supporting portion of the casing by light laser beam light energy and forms a melting joint portion along with a part of the supporting portion of the casing.

12. The vehicle lamp according to claim 11, wherein the inner reflex surface of the cavity of the casing includes a parabolic surface having a symmetry axis, and the light source is located substantially on the symmetry axis of the parabolic surface.

13. The vehicle lamp according to claim 11, wherein the end surface of the edge portion of the rib of the outer lens is configured in at least one of a substantially plane shape and a convex shape toward the supporting portion of the casing.

14. The vehicle lamp according to claim 11, wherein each of both inclined surfaces of the rib of the outer lens is formed in at least one of a substantially plane shape and a convex shape toward the casing.

15. The vehicle lamp according to claim 11, wherein the minimum width of the rib of the outer lens is within a range of 1.8 to 3.0 millimeters.

16. The vehicle lamp according to claim 11, further comprising:
a rib guide located in at least one direction toward the outer lens and toward the casing from the supporting portion of the casing so as to face at least one of both side surfaces of the rib of the outer lens.

17. The vehicle lamp according to claim 11, wherein the light source is a semiconductor light-emitting device.

18. A method for manufacturing the outer casing according to claim 1, comprising:
providing the casing;
placing the outer lens on the casing at a predetermined position so that the end surface of the rib of the outer lens contacts with the supporting portion of the casing;
pressuring the end surface of the rib toward the supporting portion of the casing at a prescribed pressure; and
emitting a laser beam light from a direction toward the rib of the outer lens toward the supporting portion of the casing along the rib, wherein the laser beam light has a relative energy of 50 percent or more on the supporting portion of the casing in contact with the end surface of the rib at the prescribed pressure via the end surface of the rib.

19. A method for manufacturing the outer casing according to claim 2, comprising:
providing the casing, in which the light source is located at the attaching portion provided at the cavity of the casing;
placing the outer lens on the casing at a predetermined position so that the end surface of the rib of the outer lens contacts with the supporting portion of the casing;
pressuring the end surface of the rib toward the supporting portion of the casing at a prescribed pressure; and
emitting a laser beam light from a direction toward the rib of the outer lens toward the supporting portion of the casing along the rib, wherein the laser beam light has a relative energy of 50 percent or more on the supporting portion of the casing in contact with the end surface of the rib at the prescribed pressure via the end surface of the rib.

20. A method for manufacturing the vehicle lamp according to claim 11, comprising:
providing the casing, in which the light source is located in the cavity of the casing;
placing the outer lens on the casing at a predetermined position so that the end surface of the rib of the outer lens contacts with the supporting portion of the casing;
pressuring the end surface of the rib toward the supporting portion of the casing at a prescribed pressure; and
emitting a laser beam light from a direction toward the rib of the outer lens toward the supporting portion of the casing along the rib, wherein the laser beam light has a relative energy of 50 percent or more on the supporting portion of the casing in contact with the end surface of the rib at the prescribed pressure via the end surface of the rib.

* * * * *